US010004081B2

(12) United States Patent
Sun et al.

(10) Patent No.: US 10,004,081 B2
(45) Date of Patent: Jun. 19, 2018

(54) SYSTEMS AND METHODS FOR PROVIDING RESOURCE SIGNALING WITHIN A WIRELESS LOCAL AREA NETWORK (WLAN)

(71) Applicant: Marvell World Trade Ltd., St. Michael (BB)

(72) Inventors: Yakun Sun, San Jose, CA (US); Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 11 days.

(21) Appl. No.: 15/371,895

(22) Filed: Dec. 7, 2016

(65) Prior Publication Data

US 2017/0171869 A1 Jun. 15, 2017

Related U.S. Application Data

(60) Provisional application No. 62/267,579, filed on Dec. 15, 2015.

(51) Int. Cl.
*H04W 72/08* (2009.01)
*H04W 72/04* (2009.01)
(Continued)

(52) U.S. Cl.
CPC ......... *H04W 72/085* (2013.01); *H04L 5/0023* (2013.01); *H04L 5/0037* (2013.01);
(Continued)

(58) Field of Classification Search
CPC ............ H04W 72/085; H04W 72/042; H04W 84/12; H04L 5/0023; H04L 5/0037;
(Continued)

(56) References Cited

U.S. PATENT DOCUMENTS

2014/0307650 A1 10/2014 Vermani et al.
2016/0128057 A1* 5/2016 Seok .................... H04L 5/0055
370/329

(Continued)

OTHER PUBLICATIONS

Josiam et al., "HE-SIG-B Mapping and Compression," IEEE 802. 1115/1315r1, Nov. 9, 2015, 19 pages.

(Continued)

*Primary Examiner* — Duc C Ho

(57) ABSTRACT

Embodiments described herein provide a method for resource unit signaling with reduced data bits in a wireless local area network. At a wireless transceiver, a data frame may be obtained for transmission. The data frame includes a first preamble portion and a second preamble portion compliant with a wireless local area network communication protocol. When an available resource unit for transmitting the data frame is less than an allowed bandwidth, the first preamble portion and the second preamble portion may be configured with resource unit signaling bits. When the available resource unit is greater than or equal to the allowed bandwidth, the resource unit may be virtually divided into a plurality of channels. At least one of the first preamble portion and the second preamble portion may be configured with a first number of bits representing a number of users spatially multiplexed on a channel from the plurality of channels.

20 Claims, 5 Drawing Sheets

(51) Int. Cl.
   *H04W 84/12* (2009.01)
   *H04B 7/0452* (2017.01)
   *H04B 7/06* (2006.01)
   *H04L 5/00* (2006.01)
   *H04L 25/03* (2006.01)

(52) U.S. Cl.
   CPC .......... *H04L 5/0044* (2013.01); *H04L 5/0053* (2013.01); *H04L 5/0064* (2013.01); *H04L 5/0092* (2013.01); *H04W 72/042* (2013.01); *H04B 7/0452* (2013.01); *H04B 7/0697* (2013.01); *H04L 5/0007* (2013.01); *H04L 5/0094* (2013.01); *H04L 2025/03426* (2013.01); *H04W 84/12* (2013.01)

(58) Field of Classification Search
   CPC ... H04L 5/0044; H04L 5/0053; H04L 5/0064; H04L 5/0092; H04L 5/0007; H04L 5/0094; H04L 2025/03426; H04B 7/0452; H04B 7/0697
   See application file for complete search history.

(56) References Cited

U.S. PATENT DOCUMENTS

2016/0286533 A1* 9/2016 Ghosh ................... H04L 5/0007
2017/0339701 A1* 11/2017 Choi ................. H04W 72/0486

OTHER PUBLICATIONS

Liu et al., "HE-SIG-B Contents," IEEE 802.11-15/1335r2, Nov. 9, 2015, 23 pages.
Stacey, "IEEE P802.11, Wireless LANs, Specification Framework for TGax," IEEE 802.11-15/0132r13, Dec. 7, 2015, 38 pages.
Sun et al., "Spatial Configuration and Signaling for MU-MIMO," IEEE 802.11-15/0817r0, Nov. 6, 2015, 20 pages.
Yunoki et al., "Considerations on HE-SIG-A/B," IEEE 802.11-15/827r2, Jul. 15, 2015, 14 pages.

* cited by examiner

SYSTEMS AND METHODS FOR PROVIDING RESOURCE SIGNALING WITHIN A WIRELESS LOCAL AREA NETWORK (WLAN)

CROSS-REFERENCE TO RELATED APPLICATION

This disclosure claims the benefit of U.S. Provisional Patent Application No. 62/267,579, filed Dec. 15, 2015, which is hereby incorporated by reference in its entirety.

FIELD OF USE

This disclosure relates to a resource signaling mechanism in a wireless data transmission system. For example, the system may include a wireless local area network (WLAN) implementing the IEEE 802.11 standard, which can be used to provide wireless transfer of data in outdoor deployments, outdoor-to-indoor communications, and device-to-device (P2P) networks.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

When operating in an infrastructure mode, wireless local area networks (WLANs) typically include an access point (AP) and one or more client stations. These WLANs operate in either a unicast mode or a multicast mode. In the unicast mode, the AP transmits information to one client station at a time. In the multicast mode, the same information is concurrently transmitted to a group of client stations. Development of WLAN standards such as the Institute for Electrical and Electronics Engineers (IEEE) 802.11a, 802.11b, 802.11g, and 802.11n standards has improved data throughput by allowing transmissions across frequency bandwidth. In such implementations, a group of client stations can share the same bandwidth for data transmission. For example, the 802.11ax standards adopts orthogonal frequency division multiple access (OFDMA) to support multiple users in the same bandwidth, and each user is scheduled with a resource unit (RU) occupying a number of subcarriers in frequency.

A resource allocation mechanism is needed to allocate the available RU to each client for transmitting data frames to the AP. For example, the AP and/or the client station need to know how much bandwidth out of a channel is allocated to a specific user. Specifically, when a large number of client stations share a transmission channel to transmit with a low-cost AP (e.g., home use), the existing resource allocation signaling mechanism may be inefficient in terms of bandwidth utilization. For example, the existing resource allocation signaling mechanism requires a large amount of resource allocation signaling information transmitted with a data frame. The data bits used for signaling may take up a significant amount of bandwidth, which reduces transmission efficiency and complicates the scheduler.

SUMMARY

Embodiments described herein provide a method for providing resource unit signaling with reduced data bits in a wireless local area network. At a wireless transceiver, a data frame may be obtained for transmission. The data frame includes a first preamble portion and a second preamble portion compliant with a wireless local area network communication protocol. When an available resource unit for transmitting the data frame is less than an allowed bandwidth, the first preamble portion and the second preamble portion may be configured with resource unit signaling bits. When the available resource unit is greater than or equal to the allowed bandwidth, the resource unit may be virtually divided into a plurality of channels. At least one of the first preamble portion and the second preamble portion may be configured with a first number of bits representing a number of users spatially multiplexed on a channel from the plurality of channels. The data frame including the configured first preamble portion and the configured second preamble portion may then be transmitted.

In some implementations, the allowed bandwidth is 20 MHz.

In some implementations, when the resource unit is equivalent to a multiple of the allowed bandwidth, a number of the plurality of channels is equivalent to a value of the multiple.

In some implementations, when the resource unit is not equivalent to a multiple of the allowed bandwidth, a number of the plurality of channels is equivalent to an integer value greater than and closest to a value of the resource unit divided by the allowed bandwidth.

In some implementations, the first preamble portion is configured with a string of bits, each bit from the string of bits indicating whether a corresponding channel has a resource unit greater than or equal to the allowed bandwidth.

In some implementations, the second preamble associated with the corresponding channel is configured without a second number of resource signaling bits when the corresponding channel has a resource unit greater than or equal to the allowed bandwidth.

In some implementations, the second preamble associated with the corresponding channel is configured with the first number of bits representing the number of users spatially multiplexed on the corresponding channel.

In some implementations, the second preamble associated with the corresponding channel is configured with a third number of bits representing a number of tones used on the corresponding channel.

In some implementations, the first number of bits has less bits than the second number of bits.

In some implementations, a combination of the first number of bits and the third number of bits has less bits than the second number of bits.

Some embodiments described herein provide a system for providing resource unit signaling with reduced data bits in a wireless local area network. The system includes a wireless transceiver, and control circuitry. The wireless transceiver is configured to obtain a data frame for transmission including a first preamble portion and a second preamble portion compliant with a wireless local area network communication protocol. The control circuitry configured to when an available resource unit for transmitting the data frame is less than an allowed bandwidth, configure the first preamble portion and the second preamble portion with resource unit signaling bits. The control circuitry is further configured to when the available resource unit is greater than or equal to the allowed bandwidth, virtually divide the resource unit into a plurality of channels, and configure at least one of the first preamble portion and the second preamble portion with a first number of bits representing a number of users spatially multiplexed on a channel from the plurality of channels. The data frame including the configured first preamble portion and the configured second preamble portion is transmitted by the wireless transceiver to a wireless channel.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for providing resource allocation signaling for large resource units (RUs) within an 802.11 (e.g., 802.11ax) wireless network. When the RU is greater than an allowed bandwidth (e.g., 20 MHz), a data field with a shorter bit length than the regular RU signaling field may be used. The shorter data field may include data bits to represent the number of STAs spatially multiplexed in this RU. No additional RU signaling bits may be used. In this way, RU signaling requires a smaller number of bits for the data frame and thus the communication efficiency can be improved.

For example, a data frame may include a high efficiency (HE) preamble portion containing a high efficiency (HE) signal field A (SIGA) and an HE signal field B (HE-SIGB). Specifically, the HE-SIGB field is used to indicate the RU signaling for each station, e.g., how much bandwidth of a channel (e.g., 20 MHz) is allocated to each client station. To improve efficiency, two HE-SIGB fields may be used for transmission if the bandwidth is larger than or equal to 40 MHz. Each HE-SIGB field covers the signaling for half of the bandwidth by default.

In some embodiments, a common block is transmitted within each HE-SIGB to carry the resource allocation signaling. For example, eight bits may be used per 242 tones (20 MHz). Therefore, 16 bits may be used in each common block in each HE-SIGB field for 80 MHz. For another example, RUs of 242 tones (20 MHz), 484 tones (40 MHz), 996 tones (80 MHz), and 996×2 tones (160 MHz) may be used. For an RU larger than 20 MHz, RU signaling information may be conveyed by both common blocks of the two HE-SIGB fields. In addition, when the RU is larger than a "basic" bandwidth of 20 MHz, the wireless access point (AP) may still choose to do RU scheduling by treating the larger RU as multiple sub-RUs of 20 MHz. In this case, the RU signaling by eight bits may be carried by the common block of the HE-SIGB field for each sub-RU of 20 MHz, which is an unnecessary overhead. Also, for a downlink (DL) multi-user (MU) multiple-input multiple-output (MIMO) system, the RU signaling may be repeated over each HE-SIGB and thus may take up a significant number of data bits, which may be unnecessary and inefficient.

Some embodiments described herein provide an HE-SIGA and HE-SIGB structure for RU signaling with RUs greater than 20 MHz. When an RU is a multiple of 20 MHz (e.g., 242/484/996/996×2 tones), the 8-bit RU signaling field in an HE-SIGB field may be replaced by a shorter field representing the number of client STAs multiplexed in this RU. The HE-SIGA field may have a corresponding bit for a respective channel to indicate whether the HE-SIGB associated with the respective channel skips the 8-bit RU signaling field. In this way, in an MU MIMO systems when the HE-SIGB field may be repeatedly transmitted, the RU signaling overhead may be reduced.

Figure 1:
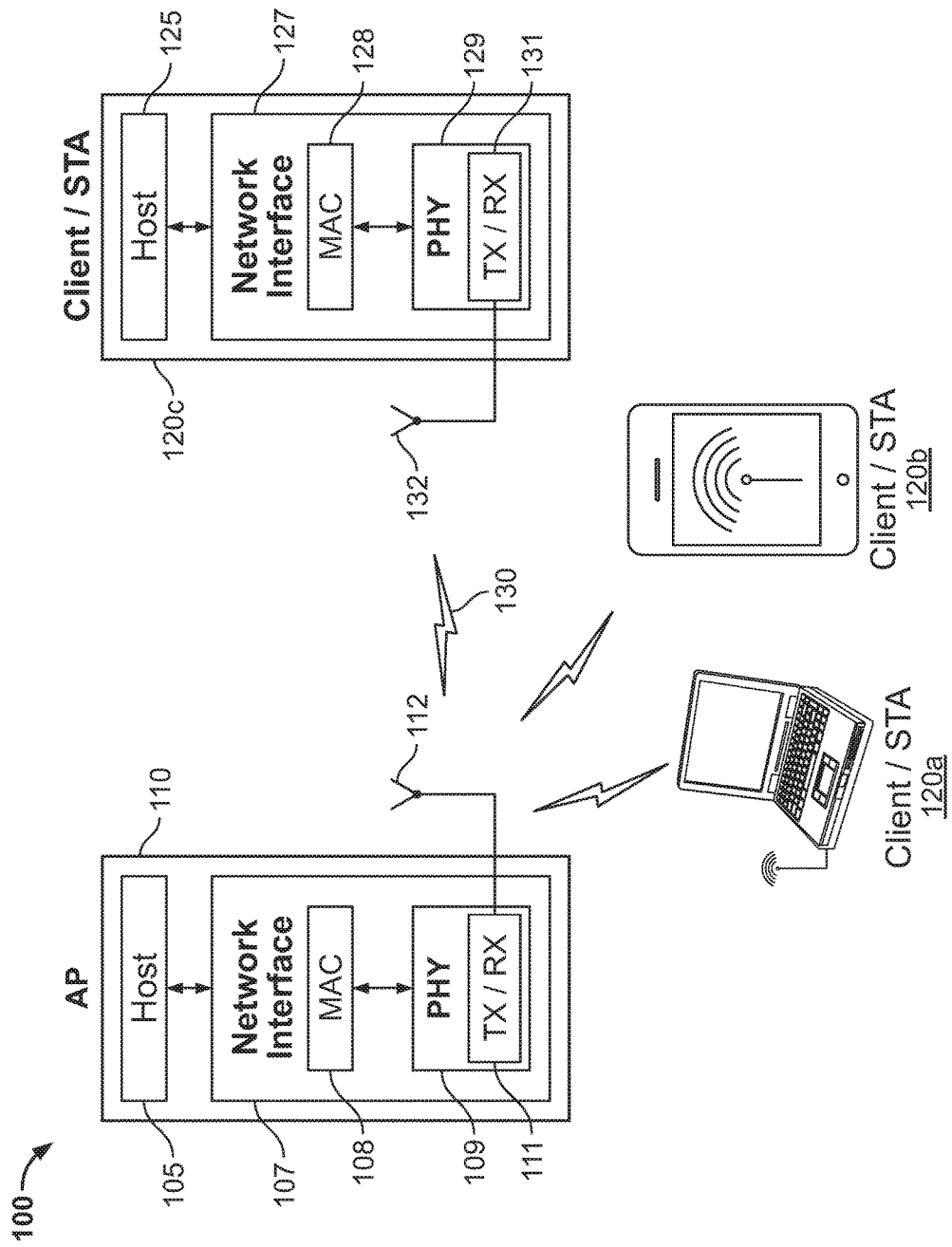
FIG. 1 is a block diagram of an example wireless WLAN 100 that the preamble transmission mechanism can be operated within, according to some embodiments described herein.
Figure 3:
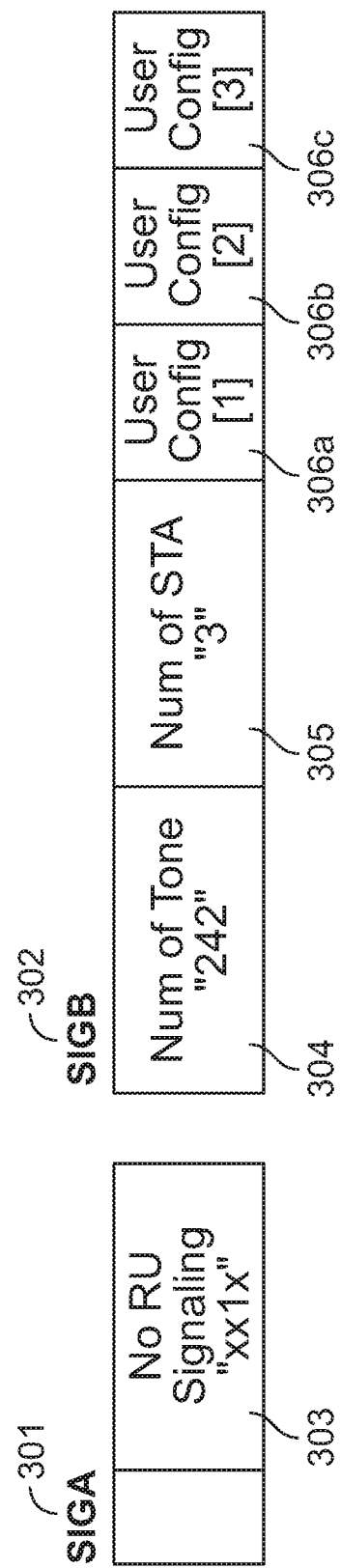
FIG. 3 provides an example block diagram illustrating an example of resource allocation signaling for an RU larger than 20 MHz with reduced signaling bits, according to some embodiments described herein.

FIG. 1 is a block diagram of an example wireless WLAN 100 that the preamble transmission mechanism can be operated within, according to some embodiments described herein. A wireless AP 110 (access point) includes a host processor 105 (host control circuitry) that may be configured to process or assist in data operation, such as modulation/demodulation, encoding/decoding, encryption/decryption, or the like. For example, the host processor 105 may be configured to prepare and transmit a data frame having a preamble with HE-SIGA and HE-SIGB bits configured as illustrated in FIG. 3, or perform the work flows illustrated in FIG. 4.

A network interface device 107 is coupled to the host processor 105, which is configured to interface with an outer network. The network interface device 107 includes a medium access control (MAC) processing unit 108 and a physical layer (PHY) processing unit 109. The PHY processing unit 109 includes a plurality of transceivers 111, and the transceivers 111 are coupled to a plurality of antennas 112.

The WLAN 100 includes a plurality of client stations 120a-c. Although three client stations 120a-c are illustrated in FIG. 1, the WLAN 100 can include different numbers (e.g., 1, 2, 3, 5, 6, etc.) of client stations 120a-c in various scenarios and embodiments. Each client station, e.g., 120a-c, may have a similar structure as that of an AP 110 (access point). For example, the client station 120c can include a host processor 125 (host control circuitry) coupled to a network interface device 127. The network interface device 127 includes a MAC processing unit 128 and a PHY processing unit 129. The PHY processing unit 129 includes a plurality of transceivers 131, and the transceivers 131 are coupled to a plurality of antennas 132 to receive or transmit data from or to the wireless communication channel.

Two or more of the client stations 120a-c may be configured to receive data such as including an 802.11 data frame 130, which may be transmitted simultaneously by the AP 110 (access point). Additionally, two or more of the client stations 120a-c can be configured to transmit data to the AP 110 (access point) such that the AP 110 receives the data.

Figure 2:
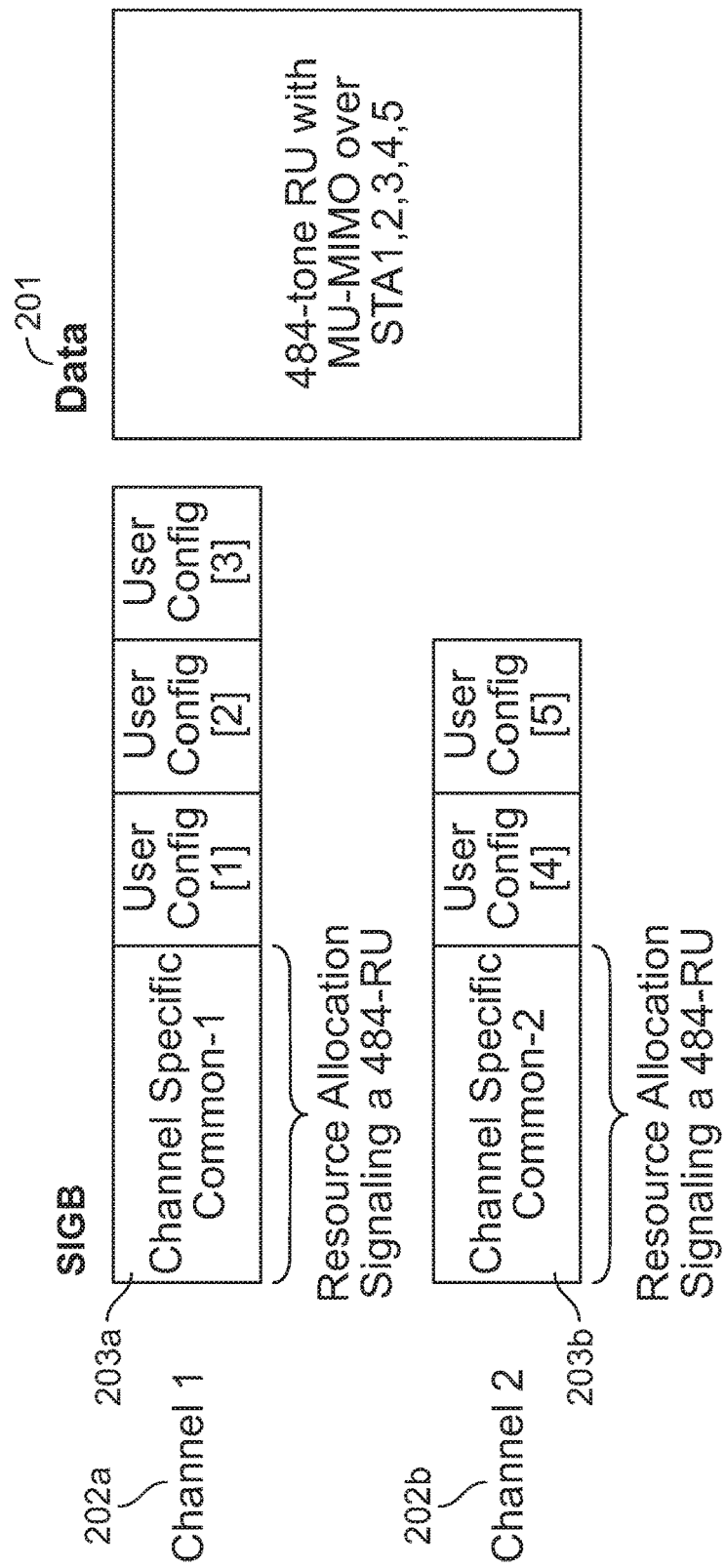
FIG. 2 provides an example block diagram illustrating an example of resource allocation signaling for an RU larger than 20 MHz, according to some embodiments described herein.

FIG. 2 provides an example block diagram illustrating an example of resource allocation signaling for an RU larger than 20 MHz, according to some embodiments described herein.

When an RU larger than 20 MHz is allocated (e.g., 484- and 996-tone RU), this RU may be used for MU-MIMO, so multiple STAs are spatially multiplexed over this RU. The large RU can be conceptually viewed as N (N>1) 20 MHz channels, and then the resource allocation can be performed as allocating multiple available 20 MHz channels. For each 20 MHz "channel," a resource signaling field indicating a large RU, as well as a subset of RU configuration fields for the STAs scheduled over this large RU may be used.

For example, the spatially multiplexed client stations may be evenly distributed into each "channel". In one implementation, each "channel" may contain a consecutive number of STAs. Alternatively, each channel may contain one STA in a round-robin fashion.

In another implementation, all STAs may be duplicated in each "channel".

In another implementation, the STAs into each "channel" may be dynamically split, and the number of STAs in each "channel" may be reflected in the common field (or a channel-specific common) field, or in SIGA.

For example, as shown in FIG. 2, for an RU that is to carry data at 40 MHz (484 tones) with five STAs spatially multiplexed, the RU may be considered as two 20 MHz channels 202a-b. User configuration fields for STAs #1, 2, and 3 may be used for RU signaling for the first channel 202a, and the user configuration fields for STAs #4 and 5 may be used for RU signaling for the second 20 MHz channel 202b.

When RU signaling field is used, the common block 203a-b, each for the HE-SIGB for channel 202a-b, respectively, may carry the resource allocation signaling information for the 484-tone RU.

FIG. 3 provides an example block diagram illustrating an example of resource allocation signaling for an RU larger than 20 MHz with reduced signaling bits, according to some embodiments described herein. A joint RU signaling for the bandwidth may be contained in each SIGB common (or channel-specific common) field. When an RU is a multiple of 20 MHz (e.g., 242/484/996/996×2 tones), RU signaling may be replaced by a shorter field to represent the number of STAs spatially multiplexed in this RU, e.g., the number of STAs may be a much shorter number and may need a smaller number of bits to represent. Additional bits may be used to indicate the RU size from 242 tones to 996×2 tones. Additional bits switching from RU signaling on/off may be used. These two subfields of bits can be in either HE-SIGA field or HE-SIGB field.

In some implementations, the HE-SIGA field 301 may have bits to represent that a respective channel has "no RU signaling," and the HE-SIGB field 302 may have bits to represent "number of tone" 304 and "number of STA" 305. The bits to represent "number of tone" 304 and "number of STA" 305 are the common (channel-specific) field for HE-SIGB-1 field and HE-SIGB-2 field.

For example, a 242-tone RU can be scheduled with three STAs multiplexed, as shown in the respective example in FIG. 3. At 303, the bit "1" indicates the corresponding channel (e.g., "XXIX" at 303 indicates the third channel out of the four channels) has a 242-tone or larger RU, and RU signaling is skipped in the HE-SIGB field. The HE-SIGB field 302 may also include bits for user configuration information 306a-c from multiple users.

In an alternative implementation (not shown in FIG. 3), bits representing "no RU signaling" and bits representing "number of tone" can be included in the HE-SIGA field, and the SIGB field only includes bits representing "number of STA". In another implementation, all the bits representing "no RU signaling", "number of tone" and "number of STA" bits may be included in the HE-SIGA field.

The "No RU signaling" subfield 303 can be set as one bit for each channel. Or the subfield 303 can be set as one bit for each SIGB, and when the "No RU signaling" subfield 303 is set, all resource allocation signals may be skipped for every channel covered by the respective HE-SIGA field 301. Alternatively, the "No RU signaling" subfield 303 can be set as one bit for all HE-SIGA fields or HE-SIGB fields (if parallel HE-SIGB fields of channels are used), and when it is set, all resource allocation signaling may be skipped for every channel.

Thus, in the respective example, eight bits for RU signaling may usually be used per 242 tones (20 MHz) under the RU signaling method in FIG. 2. But using the signaling method illustrated in FIG. 3, a shorter field with fewer bits is required, e.g., five bits including two bits representing the three client STAs, and three bits representing the RU size (e.g., the number of tones).

The number of users/STAs that can be spatially multiplexed in one RU may also be reduced when the "No RU signaling" subfield 303 (i.e., RU signaling reduction) is used. For example, if at most four users can be spatially multiplexed per RU, two bits for "number of STA" 305 may be used.

It is noted that the RU signaling reduction can be switched on only for an RU of a multiple of 40 MHz (e.g., 484/996/996×2 RU). Or alternatively, the RU signaling reduction may only be turned off when the RU is the entire bandwidth, e.g., a 242-tone RU for a 20 MHz bandwidth, or a 484-tone RU for a 40 MHz bandwidth.

Figure 4:
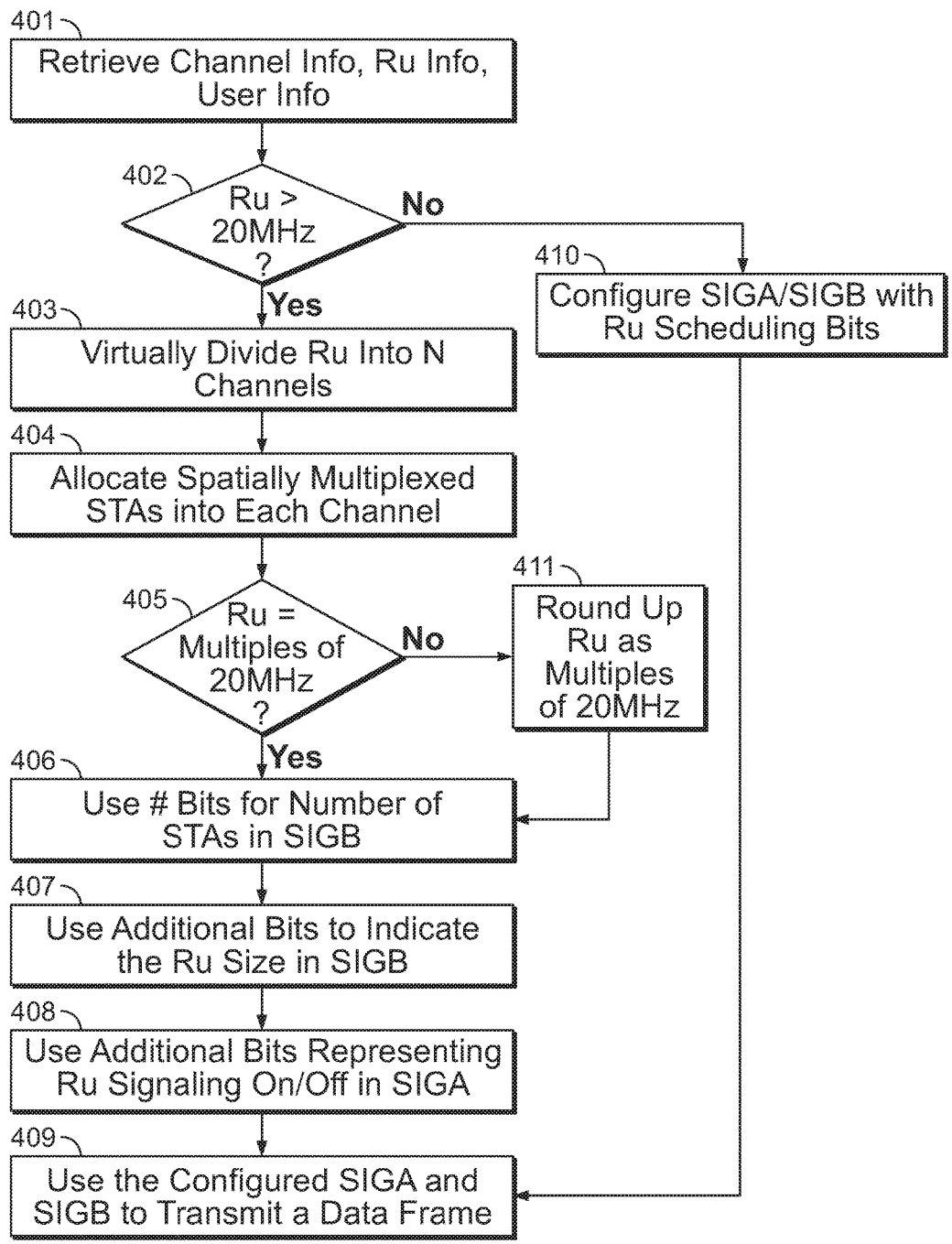
FIG. 4 provides an example logic flow diagram illustrating aspects of preparing and transmitting a data frame with a preamble having reduced signaling bits for RUs larger than 20 MHz, according to some embodiments described herein.

FIG. 4 provides an example logic flow diagram illustrating aspects of preparing and transmitting a data frame with a preamble having reduced signaling bits for RUs larger than 20 MHz, according to some embodiments described herein. At 401, channel information (e.g., the total bandwidth for transmission), RU information (e.g., size of the RU, etc.) and user information (e.g., the number of client STAs, etc.) may be obtained, at a wireless transceiver, prior to preparing and transmitting a data frame.

At 402, the wireless transceiver may determine whether the RU is greater than 20 MHz. If the RU is a large unit greater than 20 MHz, the RU may be virtually divided into N channels, wherein the number N may be further defined at 405 and 411. At 404, spatially multiplexed STAs are allocated into each channel. Or, if the RU is not greater than 20 MHz at 402, the HE-SIGA field and the HE-SIGB field may be configured with standard RU scheduling bits for transmission at 410.

At 405, it is determined whether the RU has a size as a multiple of 20 MHz, e.g., 40 MHz, 60 MHz, 80 MHz, 160 MHz, etc. If the RU is not a multiple of 20 MHz, e.g., the RU has a size of 50 MHz, 70 MHz, etc., at 411, the number of channels N may be a number that is rounded up. For example, for an RU of 50 MHz, three channels may be used; for an RU of 70 MHz, four channels may be used. At 406, a number of bits may be configured in the HE-SIGB field or the HE-SIGA field to represent the number of STAs of the respective channel. At 407, additional bits may be used to indicate the RU size in the HE-SIGB field. At 408, additional bits may be used to represent whether RU signaling is on or off, e.g., in the HE-SIGA field. At 409, the data frame having the HE-SIGA field and the HE-SIGB field configured at 406-408 may be transmitted.

Figure 5:
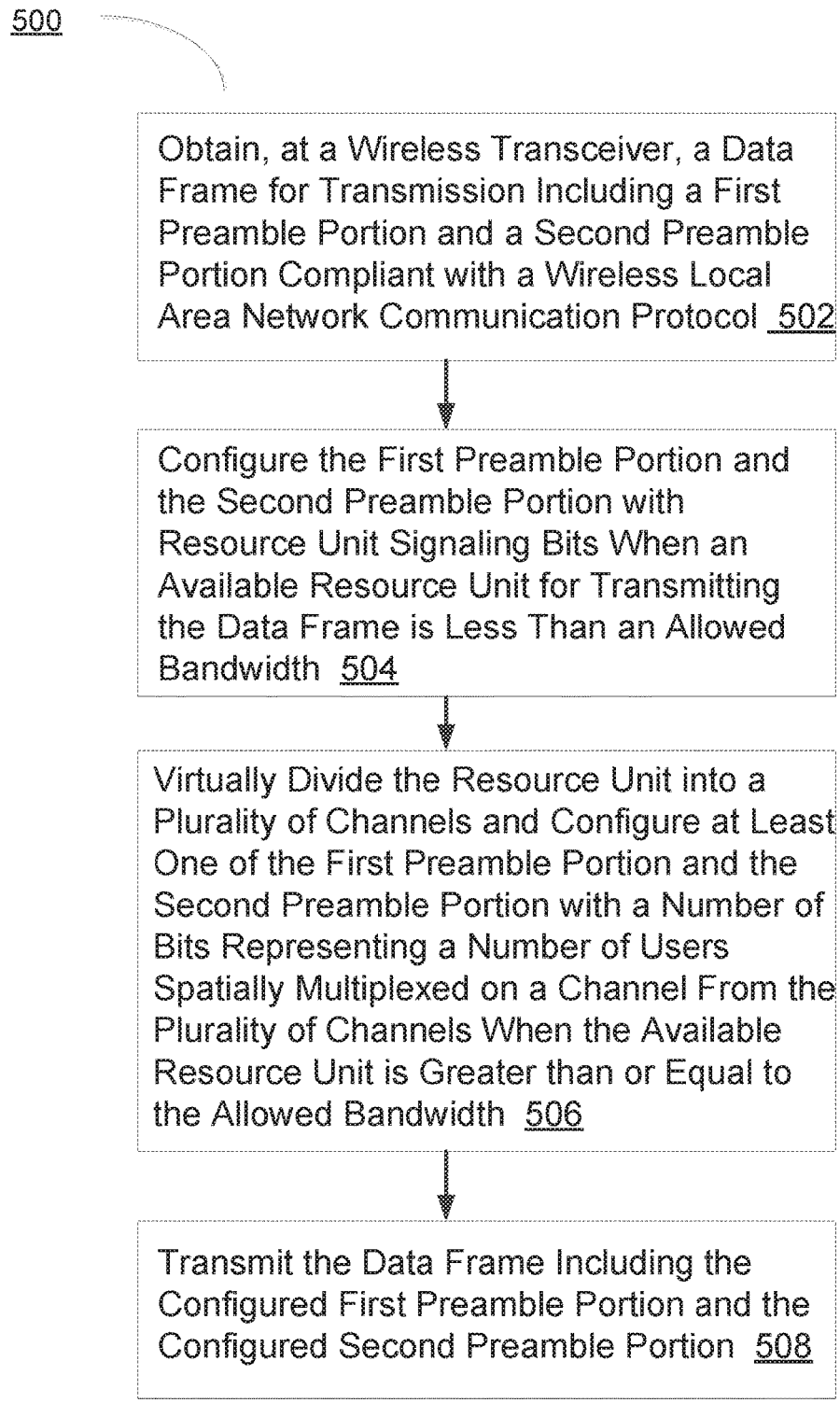
FIG. 5 provides another example logic flow diagram 500 illustrating aspects of transmitting a data frame with a preamble having reduced signaling bits for RUs larger than an allowed bandwidth, according to some embodiments described herein.

FIG. 5 provides another example logic flow diagram 500 illustrating aspects of transmitting a data frame with a preamble having reduced signaling bits for RUs larger than an allowed bandwidth, according to some embodiments described herein. At 502, a data frame may be obtained at a wireless transceiver for transmission. The data frame may be compliant with a WLAN communication protocol, such as the IEEE 802.11ax standard. The data frame may include a first preamble portion, such as the HE-SIGA field (e.g., see field 301 in FIG. 3), and a second preamble portion such as the HE-SIGB field (e.g., see field 302 in FIG. 3).

At 504, the first preamble portion and the second preamble portion may be configured with resource unit signaling bits when an available RU for transmitting the data frame is less than an allowed bandwidth (e.g., 20 MHz).

At 506, when the available RU for transmitting the data frame is greater than or equal to an allowed bandwidth (e.g., 20 MHz), the RU may be virtually divided into a plurality of channels of 20 MHz. At least one of the first preamble portion and the second preamble portion may be configured with a number of bits representing the number of users spatially multiplexed on the channel.

At 508, the data frame including the configured first preamble portion and the configured second preamble portion may be transmitted.

While this specification contains many specifics, these should not be construed as limitations on the scope of what may be claimed, but, rather, as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve the desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

Suitable computer program code residing on a computer-readable medium may be provided for performing one or more functions in relation to performing the processes as described herein. The term "computer-readable medium" as used herein refers to any non-transitory or transitory medium that provides or participates in providing instructions to a processor of the computing device (e.g., the BLE device 106a-b, the receiving server 105, or any other processor of a device described herein) for execution. Such a medium may take many forms, including but not limited to non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method for providing resource unit signaling with reduced data bits in a wireless local area network, the method comprising:
   obtaining, at a wireless transceiver, a data frame for transmission including a first preamble portion and a second preamble portion compliant with a wireless local area network communication protocol;
   when an available resource unit for transmitting the data frame is less than an allowed bandwidth:
      configuring the first preamble portion and the second preamble portion with resource unit signaling bits;
   when the available resource unit is greater than or equal to the allowed bandwidth:
      virtually dividing the resource unit into a plurality of channels; and
      configuring at least one of the first preamble portion and the second preamble portion with a first number of bits representing a number of users spatially multiplexed on a channel from the plurality of channels; and
   transmitting the data frame including the configured first preamble portion and the configured second preamble portion.

2. The method of claim 1, wherein the allowed bandwidth is 20 MHz.

3. The method of claim 1, wherein when the resource unit is equivalent to a multiple of the allowed bandwidth, a number of the plurality of channels is equivalent to a value of the multiple.

4. The method of claim 1, wherein
   when the resource unit is not equivalent to a multiple of the allowed bandwidth, a number of the plurality of channels is equivalent to an integer value greater than and closest to a value of the resource unit divided by the allowed bandwidth.

5. The method of claim 1, wherein the first preamble portion is configured with a string of bits, each bit from the string of bits indicating whether a corresponding channel has a resource unit greater than or equal to the allowed bandwidth.

6. The method of claim 5, wherein the second preamble associated with the corresponding channel is configured without a second number of resource signaling bits when the corresponding channel has a resource unit greater than or equal to the allowed bandwidth.

7. The method of claim 6, wherein the second preamble associated with the corresponding channel is configured with the first number of bits representing the number of users spatially multiplexed on the corresponding channel.

8. The method of claim 7, wherein the second preamble associated with the corresponding channel is configured with a third number of bits representing a number of tones used on the corresponding channel.

9. The method of claim 8, wherein the first number of bits has less bits than the second number of bits.

10. The method of claim 8, wherein a combination of the first number of bits and the third number of bits has less bits than the second number of bits.

11. A system for providing resource unit signaling with reduced data bits in a wireless local area network, the system comprising:
- a wireless transceiver configured to obtain a data frame for transmission including a first preamble portion and a second preamble portion compliant with a wireless local area network communication protocol; and
- control circuitry configured to:
  - when an available resource unit for transmitting the data frame is less than an allowed bandwidth:
    - configure the first preamble portion and the second preamble portion with resource unit signaling bits;
  - when the available resource unit is greater than or equal to the allowed bandwidth:
    - virtually divide the resource unit into a plurality of channels; and
    - configure at least one of the first preamble portion and the second preamble portion with a first number of bits representing a number of users spatially multiplexed on a channel from the plurality of channels;
- wherein the data frame including the configured first preamble portion and the configured second preamble portion is transmitted by the wireless transceiver to a wireless channel.

12. The system of claim 11, wherein the allowed bandwidth is 20 MHz.

13. The system of claim 11, wherein when the resource unit is equivalent to a multiple of the allowed bandwidth, a number of the plurality of channels is equivalent to a value of the multiple.

14. The system of claim 11, wherein when the resource unit is not equivalent to a multiple of the allowed bandwidth, a number of the plurality of channels is equivalent to an integer value greater than and closest to a value of the resource unit divided by the allowed bandwidth.

15. The system of claim 11, wherein the first preamble portion is configured with a string of bits, each bit from the string of bits indicating whether a corresponding channel has a resource unit greater than or equal to the allowed bandwidth.

16. The system of claim 11, wherein the second preamble associated with the corresponding channel is configured without a second number of resource signaling bits when the corresponding channel has a resource unit greater than or equal to the allowed bandwidth.

17. The system of claim 16, wherein the second preamble associated with the corresponding channel is configured with the first number of bits representing the number of users spatially multiplexed on the corresponding channel.

18. The system of claim 17, wherein the second preamble associated with the corresponding channel is configured with a third number of bits representing a number of tones used on the corresponding channel.

19. The system of claim 18, wherein the first number of bits has less bits than the second number of bits.

20. The system of claim 18, wherein a combination of the first number of bits and the third number of bits has less bits than the second number of bits.

* * * * *